United States Patent [19]

Funck

[11] 4,399,620
[45] Aug. 23, 1983

[54] PADDED SOLE HAVING ORTHOPAEDIC PROPERTIES

[76] Inventor: Herbert Funck, Am Wasserbogen 43, 8032 Lochham, Fed. Rep. of Germany

[21] Appl. No.: 303,941

[22] Filed: Sep. 21, 1981

[30] Foreign Application Priority Data

Oct. 1, 1980 [DE] Fed. Rep. of Germany ....... 3037108

[51] Int. Cl.³ ...................... A43B 13/12; A43B 13/04
[52] U.S. Cl. .................... 36/30 R; 36/32 R; 36/28
[58] Field of Search ................ 36/28, 30 R, 44, 32 R, 36/29; 128/619, 622

[56] References Cited

U.S. PATENT DOCUMENTS

| 4,124,946 | 11/1978 | Tomlin | 36/30 R |
| 4,130,947 | 12/1978 | Denu | 36/30 R |
| 4,213,255 | 7/1980 | Olberz et al. | 36/32 R |
| 4,316,332 | 2/1982 | Giese | 36/28 |

*Primary Examiner*—Werner H. Schroeder
*Assistant Examiner*—Steven N. Meyers
*Attorney, Agent, or Firm*—Weingarten, Schurgin, Gagnebin & Hayes

[57] ABSTRACT

A padded shoe sole having orthopedic properties consists of a wear-resistant lower walking sole layer of a suitable plastics or rubber material and a flexible upper padded layer of light-weight foam.

3 Claims, 7 Drawing Figures

U.S. Patent Aug. 23, 1983 Sheet 1 of 2 4,399,620
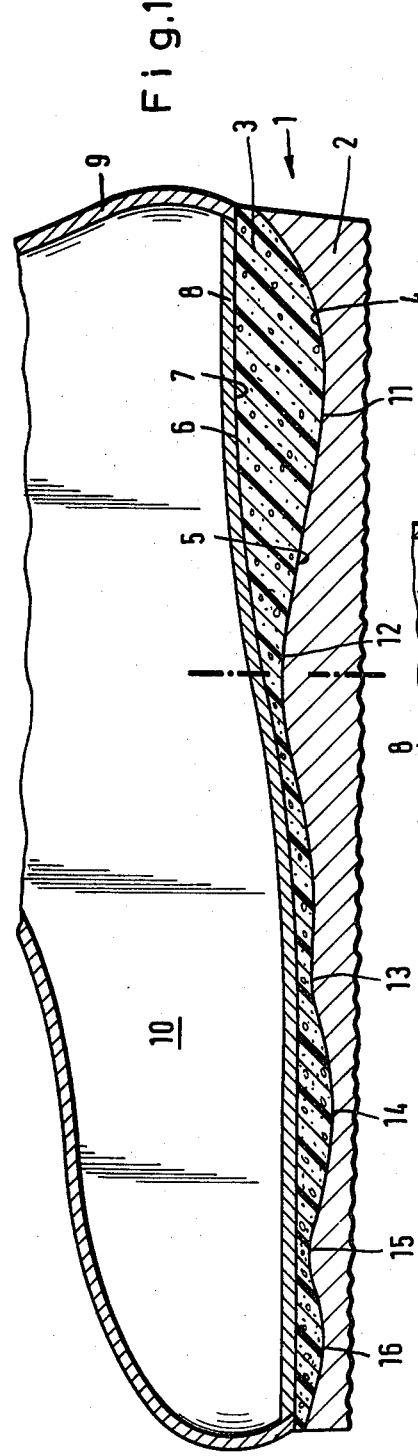
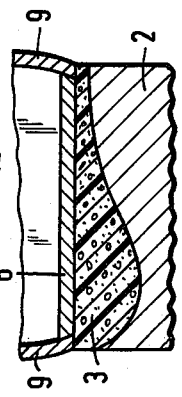
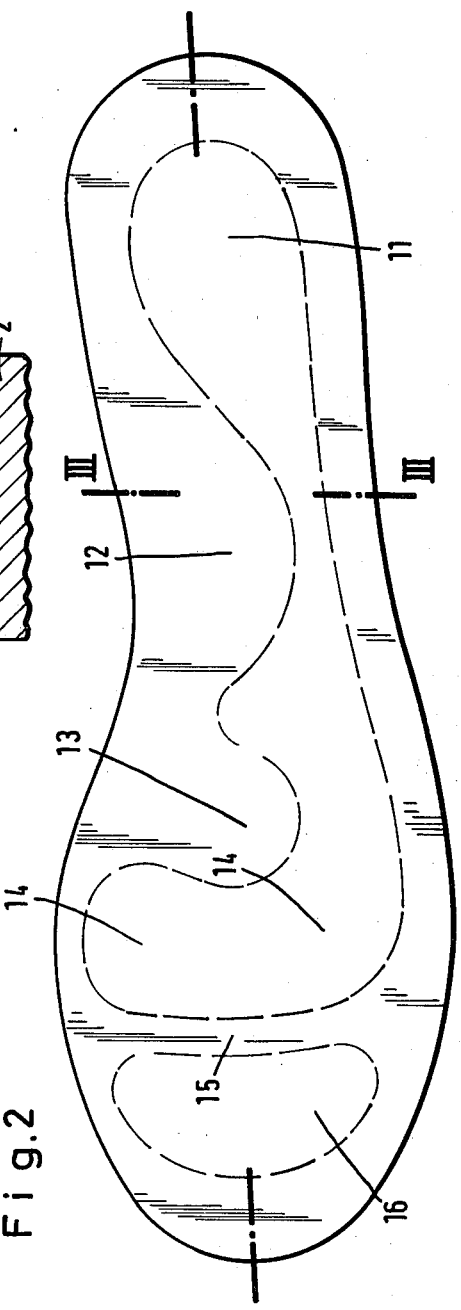

PADDED SOLE HAVING ORTHOPAEDIC PROPERTIES

The present invention relates to a padded sole having orthopaedic properties, comprising a wear-resistant lower walking sole layer of a suitable plastics or rubber material and a flexible upper padded layer of a light-weight foam.

Padded soles of this type, which consist of an upper flexible padding and a high-tenacity lower walking sole, have the advantage of a relatively light weight due to the large pore volume of the padding, and furthermore they are extremely comfortable and beneficial to the feet as compared to compact soles, which is due to the normal elasticity and the partial resilience of the padded inlay. This is especially true for shoes having a permanently deformable insole, because already after a short period the wearer's foot will model for itself an accurately matched foot bed by deformation of the insole into the padding. However, these padded soles, which are used in large numbers in the most varied types of shoes, are unsuitable for obtaining effective orthopaedic corrections in order to either retain or to recover a healthy foot structure, which is due to the practically constant thickness of the padding across large areas of the sole. Up to now, such corrective effects could be achieved only by specially shaped instep raisers or the like in conjunction with compact soles, which are either inserted as separate parts into the finished shoe or are moulded to the upper surface of the compact walking sole facing the upper shoe. It is a drawback of these known orthopaedically effective compact soles that they can only be assembled with the upper shoe when the last of the upper shoe has a negative contour at its underside, whereby the manufacture of lasts and shoes becomes very expensive. Moreover, also the orthopaedic effects are limited, because the upper walking sole contour cannot be matched to the individual shapes of feet but must rather have an average orthopaedic foot shape.

It is the object of the present invention to provide a padded sole of the type specified above which may be manufactured in a simple manner and which has a highly effective orthopaedic support function automatically adapted to the individual requirements of the respective wearer's foot.

In accordance with the present invention the above object is solved in that the upper surface of the walking sole layer and the lower surface of the padded layer have corresponding orthopaedically profiled contours and correspondingly varying thickness.

The special effects of the padded sole according to the present invention reside in that the wearer's foot—in a manner similar to conventional padded soles—may shape its individual foot bed whereby walking corresponds to that on sandy soil or forest soil, but that due to the profiled upper side of the walking sole special support zones are formed in certain areas of the sole which, while resulting in maximum comfort, at the same time can support the plantar arch orthopaedically. Due to the varying thickness of the elastic padded layer the walking sole is provided with an elasticity varying across the length and the width thereof, thus resulting in a matching to the individual wearer's feet and also in an effective support for the wearer's feet.

The advantageous properties of the padded soles according to the present invention are specially effective in conjunction with upper shoes comprising an insole, preferably of leather, which will be permanently deformed due to the pressure and the temperature of the wearer's foot and which is disposed on the upper side of the padded layer over a large area or is fixedly bonded thereto over a large area, respectively. During wearing of such a shoe the insole will arch itself preferably into those areas of the sole in which indentations filled with the padding are provided in the walking sole; however, as the padded layer is relatively thin in these sole areas the plantar arch will be effectively supported, because in these areas the insole can be deformed only to a slight extent.

As the padded sole according to the present invention has a flat surface it may readily be attached to a normal lasted upper shoe. Thus the novel padded sole constitutes an ideal combination of the advantageous properties of conventional padded soles with those of conventional so-called foot-bed soles, while the drawbacks of these known types of soles as regards their properties of wear as well as the manufacturing expenditure are eliminated.

With the padded sole according to the present invention the flexible upper padded layer may extend laterally to the periphery of the sole. However, for shoes subject to very high stresses, such as sports shoes, work shoes or safety boots, it is not recommended to have the upper flexible padded layer visibly protrude at the outer sole cut because experience has shown that the soles are subjected to the highest mechanical stress at the periphery and the tip thereof. With shoes of this type a special embodiment of the padded sole according to the present invention is most suitable, in which the walking sole layer, which at its upper side is orthopaedically shaped, laterally extends around the upper padded layer of light-weight foam to form a completely or partially surrounding skirt. This sole skirt may be of a height so as to constitute a shell-like bed for attaching the upper shoe. In this way the mechanically delicate upper padded layer is protected from external damage, and a reliable securing of the padded sole to the upper shoe is made possible via the more stable padded layer.

The padded sole according to the present invention may be made in various ways. When polyurethane foam, which produces only a slight internal mould pressure during curing, is used at least for one of the two sole layers a manufacturing method is especially suitable in which either the lower walking sole layer or the upper padded layer is foam-filled into a sole mould half the upper or lower periphery of which has the orthopaedically profiled shape. After curing of this sole layer the respective other sole layer is foam-filled in a second step into a mould the interior of which has the shape of the finished padded sole. During the second foam-filling operation an intimate and continuous firm bonding will occur between the already preformed sole layer and the sole layer subsequently foamed thereon, while at the same time the padded sole may be attached to the upper shoe if a lasted upper shoe is used as mould cover. This has the advantage that only one of the respective mould halves must have the orthopaedically profiled surface, thus resulting in reduced mould costs. Of course, it is also possible to make both sole layers separately and then to cement the two profiled surfaces to one another.

Embodiments of the present invention will be described below in detail with reference to the accompanying drawings, in which:

FIG. 1 is a first embodiment of a padded sole attached to an upper shoe;

FIG. 2 is a plan view of the padded sole shown in FIG. 1, in which the contour line is shown in dashed lines;

FIG. 3 is a cross-sectional view of the sole including the lower portion of the upper shoe, in accordance with FIG. 1;

Figure 4:
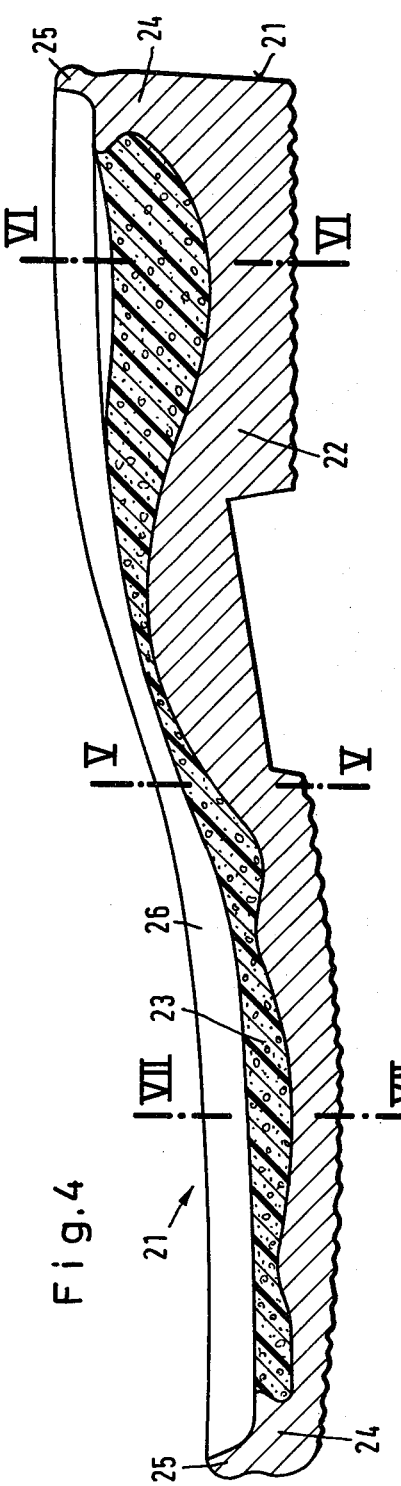
FIG. 4 is a longitudinal sectional view of a further embodiment of the padded sole.

The padded sole 1 shown in FIGS. 1 to 3 is a composite member the bottom walking sole layer 2 of which consists of a wear-resistant high-tenacity rubber or plastics material and the top padded layer 3 of which consists of a flexible light-weight foam. The upper surface 4 of the walking sole layer 2 and the lower surface 5 of the padded layer 3 have a corresponding profile. In this interface both sole layers 2, 3 are joined to one another fixedly and over a large area. The extension of the upper surface 6 of the padded layer 3 corresponds to the lower surface 7 of an insole 8, which was attached to the outer leather 9 of an upper shoe 10 in accordance with a common lasting process.

As will be apparent in particular from FIGS. 1 and 2, the two sole layers 2, 3 are formed by modelling the upper walking sole surface 4 and, respectively, the lower padded sole surface 5 in such a manner that the rear sole portion has a heel-bone bed 11, after which there follow in forward direction an ankle support 12, a suport 13 for the metatarsal bone, a bed 14 for the balls of the toes, a toe bend support 15, and a toe gripping bed 16. As will be apparent from the plan view of FIG. 2, the corresponding indentations and raised portions, respectively, of the walking sole layer 2 merge gradually into one another. The upper flexible padded layer extends to the visible edges of the sole periphery.

Figure 6:
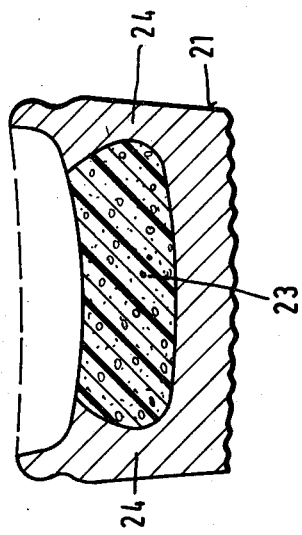
FIGS. 5 to 7 are cross-sectional views of the sole according to FIG. 4 along the lines V—V, VI—VI and VII—VII, respectively.
Figure 5:
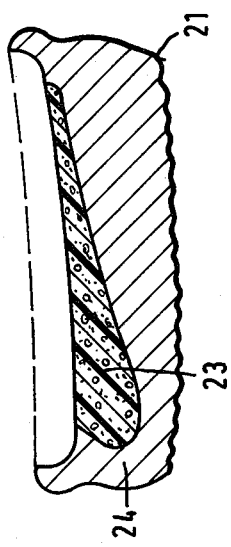
Figure 7:
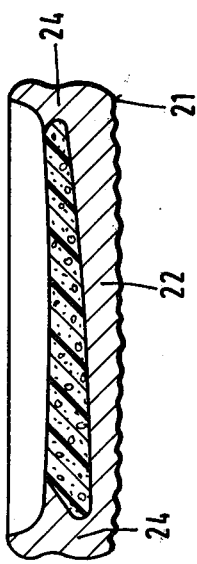

The embodiment of the sole according to the FIGS. 4 to 7 basically corresponds to the padded sole shown in FIGS. 1 to 3. It differs therefrom merely by another structure in the area of the sole edges. As will be apparent, the upper padded layer 23 does not extend fully to the lateral peripheral edges of the padded sole 21 but is surrounded on all sides by a drawn-up skirt 24 from the high-tenacity material of the lower molded sole 22. These skirt portions 24 of the walking sole layer may be extended upwardly to form narrow edges 25 whereby a so-called shell sole having a bed 25 for receiving an upper shoe results. This sole structure is especially suitable for shoes which are subject to high stresses, such as sports shoes, work shoes or safety shoes. The contour of the two sole layers 22 and 23 varying in longitudinal direction of the sole is clearly apparent from FIG. 4, and the contour of the two sole layers in the various sole portions, which varies in transverse direction of the sole, is clearly apparent from FIGS. 5, 6 and 7, respectively.

With the shaped soles designed in the manner as described above there is achieved not only a high comfort as regards the rolling motion of a foot during walking but also an effective lateral support for the foot due to the finely adjustable properties which vary across the several sole portions and to the corresponding selection of the deformation characteristics of the two layer materials. The principle according to the present invention will enable any shoe or sole manufacturer to make padded soles that will match themselves automatically to the individual shape of the wearer's foot as regards their wearing properties and their support functions, and in accordance with the type of shoe to be made, for instance safety boots or plimsolls, either a higher deformability and thus matching to the shape of the wearer's foot or a more effective orthopaedic support function may be provided.

What is claimed is:

1. A padded sole having orthopaedic properties, said sole being adapted for attachment to an upper shoe comprising:
    a wear-resistant lower walking sole layer made of a high-tenacity plastic material having upwardly extending side skirts enclosing an inner padded layer of a flexible material and further providing for enclosure of a permanently deformable insole and defining a bed for the direct mounting of the lower walking sole to the upper shoe;
    the interface between the walking sole layer and the inner padded layer being continuously formed integrally with said walking sole layer and having a foot-orthopaedic contour in the longitudinal and in the transverse direction of the sole;
    the walking sole layer exhibiting a bed-like indentation in the region of the heel bone, raised portions at the inner side of the sole in the region of the ankle and in the region of the metatarsal bone, an indentation in the region of the toe ball, and a raised portion beneath the toe bend;
    the inner padded layer having a thickness varying to be respectively thicker and thinner at positions of the indentations and raised portions of the walking sole; and
    the upper surface of the inner padded layer merging with the walking sole where said padded layer is enclosed by said side skirts to form a smooth surface adapted to receive the permanently deformable insole.

2. A padded sole according to claim 1 wherein the side skirts surround the lower periphery of the upper shoe.

3. A method of making a padded sole adapted for attachment to an upper shoe wherein the padded sole comprises:
    a wear-resistant lower walking sole layer made of a high-tenacity plastic material having upwardly extending side skirts enclosing an inner padded layer of a flexible material and further providing for enclosure of a permanently deformable insole and defining a bed for the direct mounting of the lower walking sole to the upper shoe;
    the interface between the walking sole layer and the inner padded layer being continuously formed integrally with said walking sole layer and having a foot-orthopaedic contour in the longitudinal and in the transverse direction of the sole;
    the walking sole layer exhibiting a bed-like indentation in the region of the heel bone, raised portions at the inner side of the sole in the region of the ankle and in the region of the matatarsal bone, an indentation in the region of the toe ball, and a raised portion beneath the toe bend;
    the inner padded layer having a thickness varying to be thicker and thinner at positions of the indentations and raised portions respectively of the walking sole; and the upper surface of the inner padded layer merging with the walking sole where said padded layer is enclosed by said side skirts to form a smooth surface adapted to receive the permanently deformable insole;

The method comprising the steps of:

in a first step shaping one of the two sole layers in a mold having a surface contour corresponding to the foot-orthopaedic profile; and in a second step molding the other sole layer in a final mold directly to the first sole layer.

* * * * *